(12) United States Patent
Winkler

(10) Patent No.: US 9,461,491 B2
(45) Date of Patent: Oct. 4, 2016

(54) DEVICES AND METHODS FOR MANAGING CHARGING OF RECHARGEABLE BATTERIES

(71) Applicant: GOOGLE TECHNOLOGY HOLDINGS LLC, Mountain View, CA (US)

(72) Inventor: David A. Winkler, Spring Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 66 days.

(21) Appl. No.: 14/320,687

(22) Filed: Jul. 1, 2014

(65) Prior Publication Data
US 2016/0006282 A1    Jan. 7, 2016

(51) Int. Cl.
*H02J 7/04*      (2006.01)
*H02J 7/00*      (2006.01)

(52) U.S. Cl.
CPC ............ *H02J 7/0047* (2013.01); *H02J 7/0004* (2013.01); *H02J 2007/0067* (2013.01)

(58) Field of Classification Search
CPC ... H02J 7/0091; Y02E 60/12; H01M 10/486; H01M 10/5004; Y02T 10/7005
USPC ........................................................ 320/150
See application file for complete search history.

(56) References Cited

U.S. PATENT DOCUMENTS

| | | | | |
|---|---|---|---|---|
| 5,912,547 A | * | 6/1999 | Grabon | H02J 7/0091 320/150 |
| 2007/0027580 A1 | * | 2/2007 | Ligtenberg | G05D 23/19 700/300 |
| 2010/0212338 A1 | * | 8/2010 | Hermann | B60H 1/00278 62/118 |
| 2011/0012562 A1 | * | 1/2011 | Paryani | H02J 7/047 320/152 |
| 2012/0030393 A1 | * | 2/2012 | Ganesh | G01C 21/265 710/303 |
| 2013/0009592 A1 | * | 1/2013 | Larsen | H02J 7/0045 320/107 |
| 2013/0278204 A1 | * | 10/2013 | Howard | H02J 7/0054 320/107 |
| 2014/0012447 A1 | * | 1/2014 | Gao | B60L 11/1874 701/22 |

* cited by examiner

*Primary Examiner* — Edward Tso
*Assistant Examiner* — Mohammed J Sharief
(74) *Attorney, Agent, or Firm* — Faegre Baker Daniels LLP

(57) ABSTRACT

A battery charger, which can be configured as a charger or docking station (300), includes one or more control circuits (105). A charging circuit (302) can charge one or more rechargeable batteries (118). A thermal management device (305) can alter a thermal condition of the one or more rechargeable batteries. The one or more control circuits can receive, with a communication circuit (309) an indication of a thermal state of an electronic device (100). The one or more control circuits can cause the thermal management device to alter the thermal condition of the one or more rechargeable batteries such that when the one or more rechargeable batteries are coupled to the electronic device, a thermal mass defined by the electronic device and the one or more rechargeable batteries transitions from the thermal state toward a predefined thermal mass temperature.

20 Claims, 6 Drawing Sheets

DEVICES AND METHODS FOR MANAGING CHARGING OF RECHARGEABLE BATTERIES

BACKGROUND

1. Technical Field

This disclosure relates generally to electronic devices, and more particularly to electronic devices with rechargeable batteries.

2. Background Art

The use of portable electronic devices, be they smartphones, gaming devices, or multimedia devices, is becoming a ubiquitous part of life. Users of such devices rely upon them not only for communication, but also to maintain to-do lists, surf the Internet, maintain personal and business calendars, view videos, listen to audio recordings, and to stay up-to-date with friends, family, and co-workers. Such devices are used so readily, in large part, due to their portability. Portable energy sources like rechargeable batteries eliminate the need to be continually tethered to a power outlet and allow users to take devices with them wherever they may go.

Rechargeable batteries rely upon electrochemical cells for energy storage. While there may be other components in the battery pack, including circuit boards, mechanical assemblies, circuits including charging components, fuel gauging circuits, temperature measurement circuits, and indicator circuits, the primary function of the a battery is to store and release energy. Energy is stored and released by the electrochemical cell within the battery. Each electrochemical cell includes a cathode and an anode. The two are electrically isolated by a separator. The cathode and anode offer a current path into or away from the electrochemical cell. The anode and cathode assembly are generally either wound in a "jellyroll" configuration or laminated in a stack.

When a rechargeable battery is new, the cells within that battery can typically be charged to their maximum rated capacity. Said differently, one hundred percent of the cell capacity is available to store and deliver energy when the battery is new. As the battery is charged and discharged over the course of its life, however, its energy storage capacity, which measures the battery's capability to power a device, decreases due to chemical changes within the cells. For example, after roughly 400 charge/discharge cycles, the cells within a battery may only be chargeable to eighty-five or less percent of their original maximum capacity. As a result, a user may notice that the portable electronic device that receives its power from the battery does not provide as much run time for active operations or idle time for standby operations between charging cycles as the device initially did.

It would be advantageous to have methods and systems to intelligently manage rechargeable batteries while providing satisfactory battery "run time" for attached electronic devices.

Figure 1:
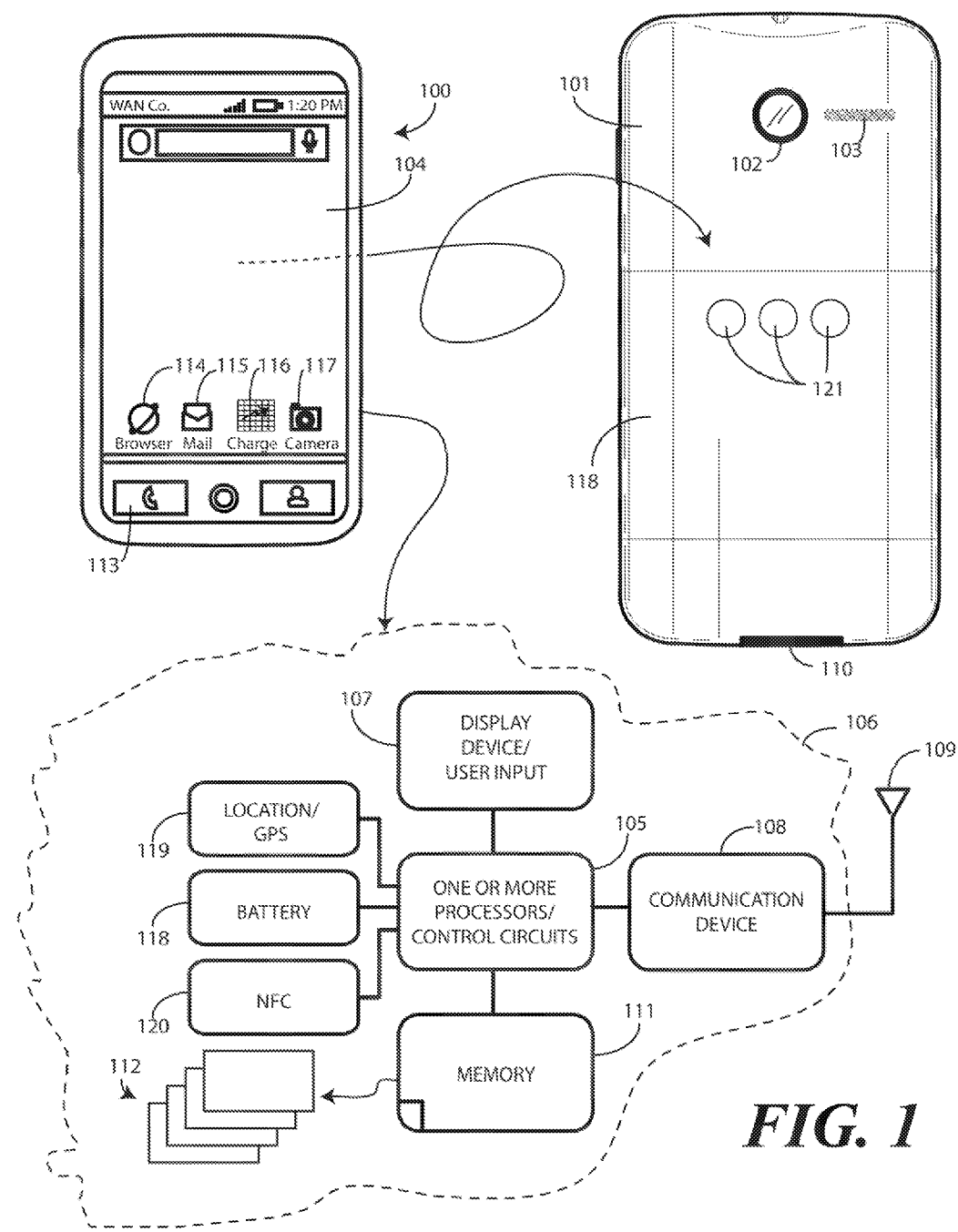
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to managing the thermal characteristics of batteries and electronic devices to achieve a desired thermal mass temperature when those batteries and electronic devices are coupled together. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of managing thermal and/or charging characteristics of batteries so that, when those batteries are coupled to an electronic device, a desired thermal mass temperature is achieved as described herein. The non-processor circuits may include, but are not limited to, power source circuits, transformer circuits, controller circuits, timer circuits, and user input devices. As such, these functions may be interpreted as steps of a method to perform thermal management of batteries and electronic devices to optimize run time, cycle life, or combinations thereof. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Anyone who has experienced long periods of time working on a laptop computer understands that a laptop in its full operational mode can get quite warm. The microprocessors of these devices are being designed to run at higher and higher speeds, with those components generating a lot of heat. The same phenomenon occurs in smaller devices, such as smartphones. When a user is watching video or engaging in another activity where continuous data is being retrieved from a tower can cause the processors in the smartphone to get hot.

Excessive heat can compromise the reliability of the rechargeable batteries powering these devices. For instance, excessive exposure to elevated temperatures can degrade chemicals and other materials disposed within the electrochemical cells, thereby reducing their ability to store and deliver electrical energy. Illustrating by example, lithium-based cells, such as lithium-ion cells, which are a popular choice for many electronic devices, include a liquid electrolyte. The electrolyte permits ions to flow between the anode and the cathode and vice versa. When exposed to elevated temperatures, this electrolyte can react with active materials or other chemicals within the cell. Moreover, electrode materials, separator materials, and other materials can degrade when exposed to elevated temperatures for extended periods of time. The degradation can result in diminished energy storage capacity. In effect, a battery that originally provided four hours of run time may only provide a small percentage of that run time after excessive exposure to heat.

At the same time, embodiments of the disclosure contemplate that some new technologies being used in electrochemical cells can be enhanced by limited exposure to temperature. For example, experimental testing has shown that charging stresses that degrade elements of a rechargeable cell can be reduced when limited temperature increases occur during charging. Thus, while extended exposure to heat will generally degrade a cell's energy storage capacity, which will limit the functionality of a device coupled to a battery containing the cell, limited exposure to heat can extend the cycle life of certain cells when applied during charging.

Embodiments of the disclosure thus provide a system that includes a charger or docking station for one or more rechargeable batteries, and optionally one or more electronic devices, that includes a thermal management device to alter a thermal condition of one or more rechargeable batteries. In one embodiment, the thermal management device can increase the thermal condition of the one or more rechargeable batteries by warming them. In one embodiment, the thermal management device can decrease the thermal condition of the one or more rechargeable batteries by cooling them. In another embodiment, the thermal management device can warm or cool the one or more rechargeable batteries as desired. The charger or docking station further includes a charging circuit to charge the one or more rechargeable batteries. The charging circuit can alter the charge rate of the one or more rechargeable batteries.

To extend one or more of run time, cycle life, or energy storage capacity, the charging circuit and thermal management device can control the charge rate and/or temperature of the one or more rechargeable batteries based upon one or more factors. Illustrating by example, in one embodiment the charger or docking station can communicate with an electronic device, which may be locally stored in the charger or docking station or which may be operating remotely from the charger or docking station and communicating wirelessly with the charger or docking station, to determine a thermal state of the electronic device. The charging circuit and the thermal management device can then adjust the charge rate to, or the thermal condition of, the one or more rechargeable batteries as a function of the temperature of the electronic device. Accordingly, when the one or more rechargeable batteries are coupled to the electronic device, a thermal mass defined by the electronic device and the one or more rechargeable batteries transitions from the thermal state of the one or more rechargeable batteries to a predefined thermal mass temperature. Thus, a cool battery may be attached to a hot electronic device, or vice versa, to achieve a desired thermal mass temperature of the system that improves one or more of run time, cycle life, or energy storage capacity.

Embodiments of the disclosure contemplate that electronic devices to which rechargeable batteries are attached frequently define a large thermal mass. Where a rechargeable battery that is to be "swapped" into, or alternatively attached to, the electronic device, if that device is cooled to a level that does not unduly impair the electrical performance of the battery, such as about 10 degrees centigrade, the cooling effect provided from the battery to the electronic device can have a significant impact on the performance of the electronic device. Thus, in one embodiment, one or more control circuits of a charger or docking station cause the thermal management device to alter the thermal condition of one or more rechargeable batteries coupled with the charger or docking station such that when the one or more rechargeable batteries are coupled to the electronic device, a thermal mass defined by the electronic device and the one or more rechargeable batteries transitions from the thermal state toward a predefined thermal mass temperature. Should the temporary cooling of the battery alter the performance characteristics of the electrochemical cells therein, the warming of the battery due to its attachment to the electronic device will restore those performance characteristics in due course. A "cool" battery inserted into a cavity of an electronic device can work to reduce temperature of the electronic device's components to help restore full operating performance characteristics in a short time. In one or more embodiments, a thermally enhanced device such as a phase change material can be disposed within the one or more rechargeable batteries to augment this effect.

In another embodiment, the charging circuit and thermal management device can control the charge rate and/or temperature of the one or more rechargeable batteries based upon an optimal temperature for charging the one or more rechargeable batteries to minimize charging stress. As noted above, stress on some rechargeable battery technologies is reduced by applying heat during charging. However, stress on other rechargeable battery technologies can be reduced by cooling the cells during charging. Thus, in one or more embodiments, the charging circuit and thermal management device can control the charge rate and/or temperature of the one or more rechargeable batteries to extend cycle life.

In yet another embodiment, the charging circuit and thermal management device can control the charge rate and/or temperature of the one or more rechargeable batteries based upon a location of an electronic device with reference to the charger or docking station and/or an estimation of when the electronic device will be coupled to the charger or docking station. Illustrating by example, in one embodiment one or more control circuits of a charger or docking station can, via communication with an electronic device, anticipate when a user arrives home or is otherwise proximally located with the charger or docking station so as to attach the electronic device thereto. This estimation, combined with detection of a thermal state of the electronic device, can allow the charging circuit and thermal management device to control the charge rate and/or temperature by cooling the battery if the electronic device is hot or by accelerating the charge rate if the one or more rechargeable batteries are not fully charged.

In one embodiment this estimated "time to dock" can be a function of communication with an electronic device having a location detector such as a Global Positioning System (GPS) device. In another embodiment, the estimation can be a function of a user's behavioral patterns. If, for example, the user generally places an electronic device into the charger at 10:00 PM, this behavior can be used to adjust temperature and/or charge rate. The adjustment of the thermal condition of the one or more rechargeable batteries can assist in optimizing charging time as well as reducing "wear out" of the cells within the one or more rechargeable batteries by regulating temperature during charging.

In yet another embodiment, the charging circuit and thermal management device can control the charge rate and/or temperature of the one or more rechargeable batteries based upon how much longer an electronic device will be coupled to the charger or docking station. For example, some electronic devices include feature sets that allow a user to put the device to "sleep" for a predefined time by silencing alarms for a predefined time interval, thereby allowing the user to sleep. In one or more embodiments, one or more control circuits of the charger or docking station can retrieve information relating to this interval from the electronic device to permit charging of one or more rechargeable batteries coupled to the charger or docking station to be deliberately slow so as to extend one or more of cycle life or energy storage capacity.

As described above, embodiments of the disclosure facilitate communication between an electronic device and a charger or docking station that can alter a thermal condition of one or more rechargeable batteries so that, when the one or more rechargeable batteries are swapped into the electronic device, a thermal mass of the resulting system moves the device to a desired temperature. The alteration of charge rate and/or thermal condition can be based on the one or more factors set forth above in one or more embodiments. The factors above are explanatory only, and are not meant to be limiting. The factors could be used individually or in combination. Of course, additional factors will be obvious to those of ordinary skill in the art having the benefit of this disclosure.

Turning now to FIG. 1, illustrated therein is one explanatory electronic device 100 configured in accordance with one or more embodiments of the disclosure. The explanatory electronic device 100 is shown as a smart phone for ease of illustration. However, it will be obvious to those of ordinary skill in the art having the benefit of this disclosure that other portable electronic devices may be substituted for the explanatory smart phone as noted above. The electronic device 100 may be configured as a palm-top computer, a tablet computer, a gaming device, wearable computer, a remote controller, a media player, laptop computer, portable computer, or other electronic device.

The electronic device 100 includes a housing 101. Features can be incorporated into the housing 101. Examples of such features include an optional camera 102 or an optional speaker port 103, which are show disposed on the backside of the electronic device 100 in this embodiment.

In one embodiment, a display 104 is disposed along the front surface of the housing 101 of the electronic device 100. In one embodiment, the display 104 is configured to provide visual output, images, or other visible indicia to a user. In one embodiment, the display 104 comprises an organic light emitting diode (OLED) device. In one embodiment, the display 104 comprises a touch sensor to form touch sensitive display configured to receive user input across the surface of the display 104. The display 104 can also be configured with a force sensor. Where configured with both a touch sensor and force sensor, one or more control circuits 105 of the electronic device 100, operable with the touch sensor and the force sensor, can determine not only where the user contacts the display 104, but also how much force the user employs in contacting the display 104.

In FIG. 1, the explanatory electronic device 100 is shown illustratively with a schematic block diagram 106. In this embodiment, the electronic device 100 includes a user interface 107, which can include the display 104. The illustrative electronic device 100 also includes a communication circuit 108 that can be configured for wired or wireless communication with one or more other devices or networks. The networks can include a wide area network, a local area network, or personal area network as well. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, and other networks. The communication circuit 108 can include wireless communication circuitry, one of a receiver, a transmitter, or transceiver, and one or more antennas 109.

The electronic device 100 includes one or more control circuits 105, which can include one or more processors. The one or more control circuits 105 are responsible for performing the various functions of the device. The one or more control circuits 105 can be a microprocessor, a group of processing components, one or more Application Specific Integrated Circuits (ASICs), programmable logic, or other type of processing device. The one or more control circuits 105 can be operable with the user interface 107 and the communication circuit 108, as well as various peripheral devices, ports, or connectors 110 of the electronic device 100.

The one or more control circuits 105 can be configured to process and execute executable software code to perform the various functions of the electronic device 100. A storage device, such as memory 111, stores the executable software code used by the one or more control circuits 105 for device operation. The executable software code used by the one or more control circuits 105 can be configured as one or more modules 112 that are operable with the one or more control circuits 105. Such modules 112 can store instructions, control algorithms, and so forth. The instructions can instruct processors or one or more control circuits 105 to perform the various steps, touch sensing, and methods described below.

In one embodiment, the one or more control circuits 105 are responsible for running the operating system environment of the electronic device 100. The operating system environment can include a kernel, one or more drivers, and an application service layer, and an application layer. The operating system environment can be configured as executable code operating on one or more control circuits 105 or control circuits of the electronic device 100.

The application layer can be responsible for executing application service modules. The application service modules may support one or more applications or "apps." Examples of such applications shown in FIG. 1 include a cellular telephone application 113 for making voice telephone calls, a web browsing application 114 configured to allow the user to view webpages on the display 104 of the electronic device 100, an electronic mail application 115 configured to send and receive electronic mail, a charging optimization application 116 in accordance with the methods described below to optimize one or more of run time of the electronic device, or cycle life or energy storage capacity of one or more rechargeable batteries 118, and a camera application 117 configured to capture still (and optionally video) images. These applications are illustrative only, as others will be obvious to one of ordinary skill in the art having the benefit of this disclosure.

In one or more embodiments, a location sensor 119 is operable with the one or more control circuits 105. In one embodiment, the location sensor 119 is a global positioning system device for determining where the electronic device 100 is located. The global positioning system device can be configured for communicating with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the global positioning system device autonomously or with assistance from terrestrial base stations, for example with assistance from a cellular communication network or other ground based network, or as part of a Differential Global Positioning System (DGPS), as is well known by those having ordinary skill in the art. While a global positioning system device is one example of a location sensor 119, it will be clear to those of ordinary skill in the art having the benefit of this disclosure that other location determination devices, such as electronic compasses or gyroscopes, could be used as well.

In one or more embodiments, a near field communication circuit 120 is operable with the one or more control circuits 105. The near field communication circuit 120 can provide a near field communication interface such that the electronic device 100 can wirelessly communicate with a variety of near field communication devices employing various near field communication technologies and protocols. Exemplary near field communication devices include a charger or docking station, as will be described in more detail below with reference to FIG. 3.

The near field communication circuit 120 can include—as an antenna—a communication coil that is configured for near-field communication at a particular communication frequency. In one embodiment, the communication coil is wrapped about a ferrite or other material. The term "near-field" as used herein refers generally to a distance of less than about a meter or so. The communication coil communicates by way of a magnetic field emanating from the communication coil when a current is applied to the coil. A communication oscillator applies a current waveform to the coil. The near field communication circuit 120 may further modulate the resulting current to transmit and receive data. The near field communication circuit 120 works to facilitate data communication with other near field communication devices by transmitting data in radio frequency form. One may refer to the publicly available standard at www.ecma-international.org/publications/files/ECMA-ST/Ecma-340.pdf, which is incorporated herein by reference, for more details. Where the near-field communication is RFID communication, for example, this frequency may be about 13.56 MHz as is directed by recognized RFID standards.

One or more rechargeable batteries 118 can attach to the electronic device 100 or the housing 101 of the electronic device 100. The one or more rechargeable batteries 118 can include at least one electrochemical cell disposed therein. In one or more embodiments, the one or more rechargeable batteries 118 further include protection circuitry for protecting against battery faults, and optionally charging circuitry for controlling the current being delivered to the at least one electrochemical cell. Where included, the protection circuitry and charging circuitry may be combined into a single circuit. The one or more rechargeable batteries 118 can also include one or more internal processors to monitor an amount of energy stored in the at least one electrochemical cell, the temperature of the at least one electrochemical cell, and other parameters. Alternatively, the one or more control circuits 105 of the electronic device can perform these functions.

A temperature sensor, such as a thermistor for example, can be included in any of the one or more rechargeable batteries 118, the electronic device 100, or combinations thereof to sense the temperature of the at least one electrochemical cell, the electronic device 100, or combinations thereof. For typical lithium-ion applications, the amount of energy stored in the at least one electrochemical cell is proportional to the voltage across the cell, which can be read by a voltage sensor. Other chemistries may not exhibit this energy-voltage proportionality, and other energy storage measurement techniques, like fuel gauging, may be preferential.

In one or more embodiments, the one or more rechargeable batteries 118 can include external terminals to facilitate charging. In other embodiments, charging current can be delivered to the one or more rechargeable batteries 118 through one or more connectors 110 of the electronic device.

Figure 2:
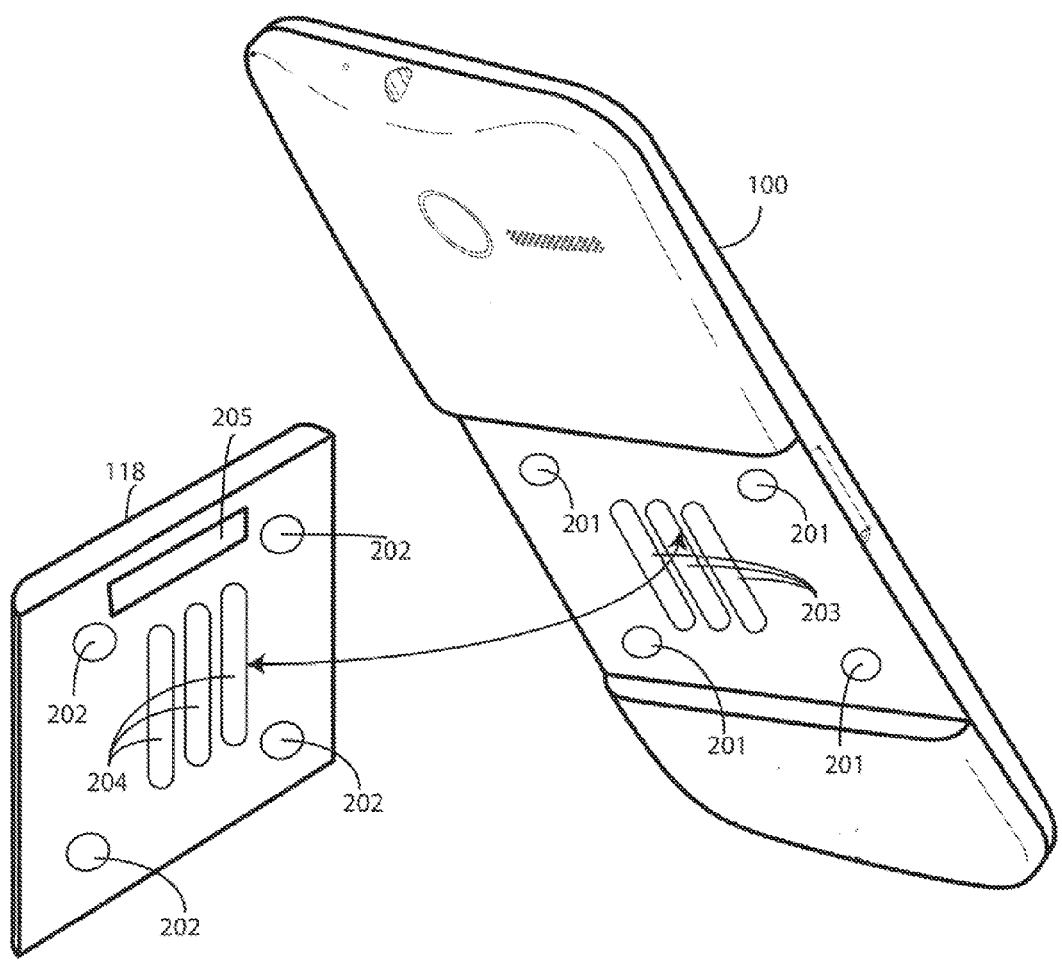
FIG. 2 illustrates another view of one explanatory electronic device in accordance with one or more embodiments of the disclosure.

Turning to FIG. 2, illustrated therein is a perspective view of the electronic device 100 with the one or more rechargeable batteries 118 detached from a battery receiver 200 disposed along the electronic device 100. In one embodiment, the one or more rechargeable batteries 118 are selectively attached to the battery receiver 200 of the electronic device 100 by one or more attachment devices 201,202. In this illustrative embodiment, the attachment devices 201, 202 are complementary magnets. The use of magnetic attachment devices is useful for chargers or docking stations that can automatically remove one rechargeable battery and replace it with another, as is the case with one or more embodiments of the disclosure. However, other types of attachment devices 201,202, such as snaps, latches, press-fit attachment devices, and so forth, can be substituted for the magnetic attachment devices of FIG. 2. Still other attachment devices 201,202 will be obvious to those of ordinary skill in the art having the benefit of this disclosure.

One or more complementary electrical terminals 203,204 can be provided to deliver current from the at least one electrochemical cell disposed within the one or more rechargeable batteries 118 to the components of the electronic device 100. Optionally, charging current from a charger or docking station can charge the at least one electrochemical cell disposed within the one or more rechargeable batteries 118 through the electrical terminals 204 as well. As noted above, the one or more rechargeable batteries 118 can optionally include a thermally enhanced material 205, such as a phase change material, disposed within or on the one or more rechargeable batteries 118 to augment any thermal condition adjustment applied by a charger or docking station as described herein.

Figure 3:
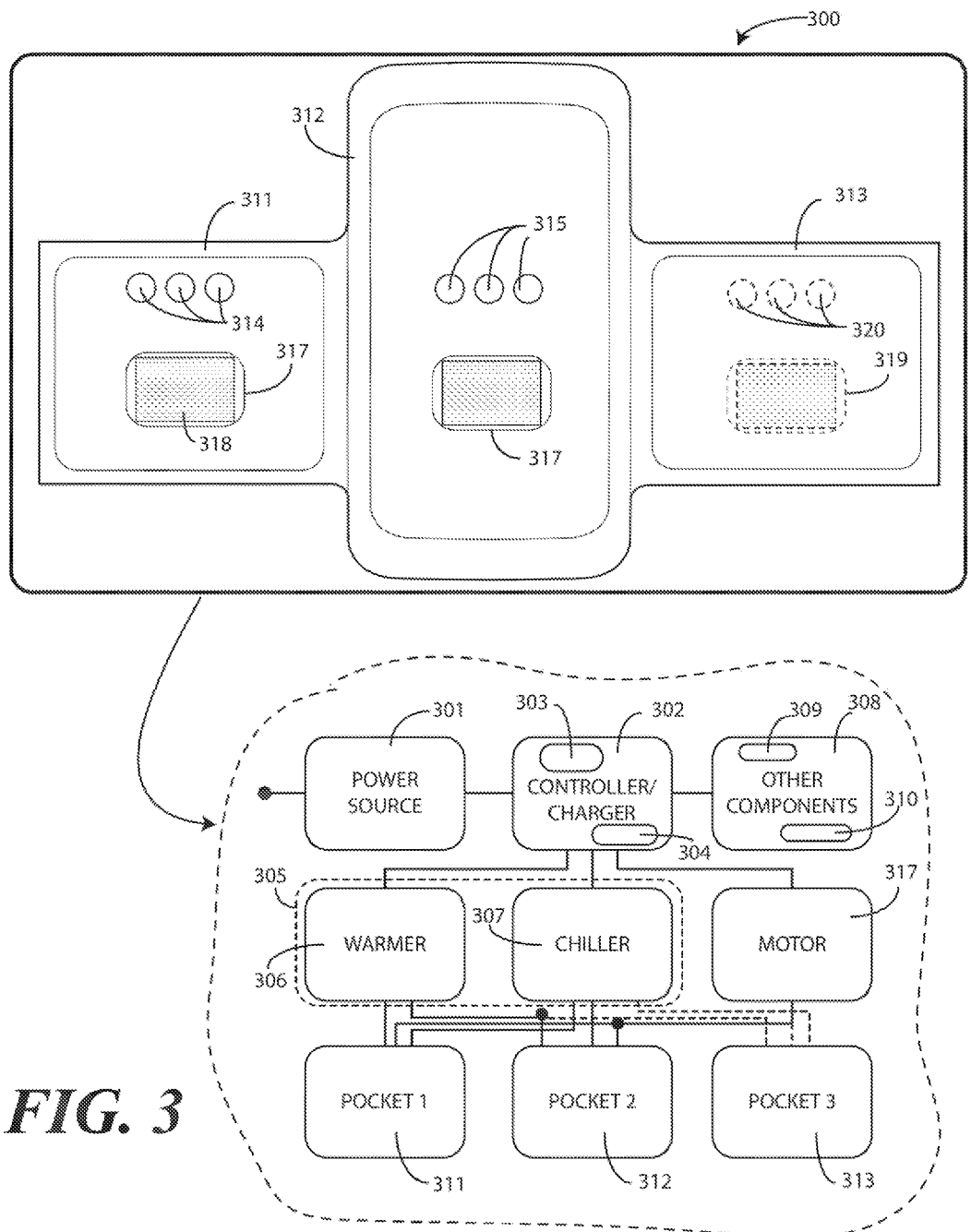
FIG. 3 illustrates one explanatory charger in accordance with one or more embodiments of the disclosure.

Turning now to FIG. 3, illustrated therein is one embodiment of a charger or docking station 300 configured in accordance with one or more embodiments of the disclosure. The charger or docking station 300 includes a power source 301 that receives power from a power supply (not shown). The charger or docking station 300 also includes a charging circuit 302, which is operable with one or more control circuits 303. The one or more control circuits 303 can include one or more processors. The one or more control circuits 303 can be responsible for performing the various functions of the charger or docking station 300. The one or more control circuits 303 can be a microprocessor, a group of processing components, one or more Application Specific Integrated Circuits (ASICs), programmable logic, or other type of processing device.

The one or more control circuits 303 can be configured to control an amount of charging current that flows to the one or more rechargeable batteries coupled to the charger or docking station 300. In one embodiment, the one or more control circuits 303 accomplish this with a current control circuit 304 that is included in the charging circuit 302. The current control circuit 304 can include a sense resistor, a pass element such as a field effect transistor (FET) and a diode. The one or more control circuits 303 can cause the charging circuit 302 to determine suitable currents for charging one or more rechargeable batteries coupled to the charger or docking station 300. In one embodiment, the one or more control circuits do this by reading data stored in a memory of the one or more rechargeable batteries. In one or more embodiments, the one or more control circuits 303 can also measure the temperatures of the one or more rechargeable batteries by measuring a voltage between a thermistor or other temperature-measuring device disposed within the one or more rechargeable batteries coupled to the charger or docking station and a pull-up resistor disposed within the charging circuit 302.

In operation, when the charging circuit 302 is receiving power from the power source 301, charging current flows through the charging circuit 302. The one or more control circuits 303 can monitor the amount of charging current being transferred to the one or more rechargeable batteries coupled to the charger or docking station with the sense resistor of the charging circuit 302. The voltage applied to the one or more rechargeable batteries can be sensed from the electrical terminals of the one or more rechargeable batteries coupled to the charger or docking station 300.

During the charging process, in addition to monitoring charging current and charging voltage, the one or more control circuits 303 can monitor the temperature of at least one electrochemical cell disposed within the one or more rechargeable batteries coupled to the charger or docking station 300. This monitoring can be in accordance with thermal limitations for the at least one electrochemical cell as set by the manufacturer.

The one or more control circuits 303 are also operable with a thermal management device 305. The thermal management device 305 is to alter a thermal condition of the one or more rechargeable batteries coupled to the charger or docking station 300 in one or more embodiments. The illustrative thermal management device 305 of FIG. 3 is shown including a warmer 306 to alter the thermal condition of the one or more rechargeable batteries coupled to the charger or docking station 300 by warming them to increase their temperature and a chiller 307 to alter the thermal condition of the one or more rechargeable batteries coupled to the charger or docking station 300 by cooling them to decrease their temperature. In another embodiment, the thermal management device 305 may include only the warmer 306 and no chiller 307. In another embodiment, the thermal management device 305 may include only the chiller 307 and no warmer 306.

Other components 308 can be included with the charger or docking station 300. For example, in one embodiment the other components 308 include a communication circuit 309 that is operable with the one or more control circuits 303. The communication circuit 309 can be used to communicate with one or more electronic devices across a network. The communication can be wired, wireless, or combinations thereof. The other components 308 can also include a near-field communication circuit 310 similar to that described with reference to FIG. 1 above.

In one embodiment, the one or more control circuits 303 are to receive, with either or both of the communication circuit 309 or the near-field communication circuit 310 an indication of a thermal state of an electronic device. For example, when the electronic device is coupled to the charger or docking station 300, the one or more control circuits 303 may obtain the indication of the thermal state of the electronic device with the near-field communication circuit 310. By contrast, when a user is on the go with the electronic device, the one or more control circuits 303 may receive the indication of the thermal state of the electronic device via the communication circuit across the network. The indication of the thermal state of the electronic device may include a temperature of the electronic device, an operating mode of the electronic device, a processor operating load of the electronic device, an application operating load of the electronic device, or other indicators that may provide information regarding the thermal state of the thermal mass defined by the electronic device. Other indications will be obvious to those of ordinary skill in the art having the benefit of this disclosure.

Upon receiving the indication of the thermal state of the electronic device 100, the one or more control circuits 303 can, in one embodiment, cause the thermal management circuit to alter the thermal condition of the one or more rechargeable batteries. In one embodiment, the altering of the thermal condition of the one or more rechargeable batteries is such that when the one or more rechargeable batteries are subsequently coupled to the electronic device, a thermal mass defined by the electronic device and the one or more rechargeable batteries transitions from the thermal state toward a predefined thermal mass temperature.

Illustrating by example, suppose that the indication of the thermal state of the electronic device is an operating temperature of 110 degrees Fahrenheit. The one or more control circuits 303 may determine this via communication with the electronic device through the communication circuit 309. It may then be known that the electronic device works optimally when its operating temperature is, for example, less than 80 degrees Fahrenheit. The one or more control circuits 303 of the charger or docking station 300 may then cause the chiller 307 to alter the thermal condition of the one or more rechargeable batteries coupled to the charger or docking station 300 by cooling them to 50 degrees Fahrenheit. Accordingly, when the user comes home and attaches the one or more rechargeable batteries coupled to the charger or docking station 300 to the electronic device, the cooler battery will move the operating temperature of the thermal mass defined by the electronic device and the battery from 110 degrees Fahrenheit toward a temperature below 80 degrees Fahrenheit.

In one embodiment, the one or more control circuits 303 are to cause the thermal management device 305 to one or more of selectively heat or selectively cool the one or more rechargeable batteries as a function of the thermal state of the electronic device and the predefined thermal mass temperature desired once the one or more rechargeable batteries coupled to the charger or docking station 300 are coupled to the electronic device. In one embodiment, the one or more processors are to cause the charging circuit 302 to alter a charge rate of the one or more rechargeable batteries coupled to the charger or docking station 300 as a function of the thermal state of the electronic device as well. As noted above, where a rechargeable battery that is to be "swapped" into, or alternatively attached to, the electronic device, if that device is cooled to a level that does not unduly impair the electrical performance of the battery, the cooling effect provided from the battery to the electronic device can have a significant impact on the performance of the electronic device. Thus, in one embodiment, one or more control circuits of a charger or docking station cause the thermal management device to alter the thermal condition of one or more rechargeable batteries coupled with the charger or docking station such that when the one or more rechargeable batteries are coupled to the electronic device, a thermal mass defined by the electronic device and the one or more rechargeable batteries transitions from the thermal state toward a predefined thermal mass temperature. A battery cooled by the chiller can be attached to a warm electronic device to reduce temperature of the electronic device's components to help restore full operating performance characteristics in a short time.

In one or more embodiments, the one or more control circuits 303 of the charger or docking station 300 can also receive, with the communication circuit 309, location information of the electronic device. For example, the one or more control circuits 303 can communicate with the electronic device to receive location information from its location detector. Alternatively, a user can push this information to the charger or docking station by actuating a charging optimization application (116) in an electronic device (100).

From this information, the one or more control circuits 303 can estimate a time by which the electronic device will be coupled to the charger or docking station 300. The one or more control circuits 303 can then cause the thermal management circuit to alter one or more of the thermal condition of the one or more rechargeable batteries or a charge rate of the one or more rechargeable batteries as a function of the time by which the electronic device will be coupled to the battery charger. As noted above, in one embodiment the charging circuit 302 and thermal management device 305 can control the charge rate and/or temperature of the one or more rechargeable batteries based upon a location of an electronic device with reference to the charger or docking station 300 and/or an estimation of when the electronic device will be coupled to the charger or docking station 300. This estimation, combined with detection of a thermal state of the electronic device, can allow the charging circuit 302 and thermal management device 305 to control the charge rate and/or temperature by cooling the battery if the electronic device is hot or by accelerating the charge rate if the one or more rechargeable batteries are not fully charged.

In one or more embodiments, the one or more control circuits 303 can cause the thermal management device 305 to transition the thermal condition from a first temperature to a second temperature as a function of the estimated time. Illustrating by example, the first temperature can comprise a charging temperature to reduce degradation of one or more cells of the one or more rechargeable batteries by reducing charging stress. This first temperature may be different, i.e., higher or lower depending upon application and cell technology, than is the second temperature. The second temperature can be a temperature to move the thermal mass from the thermal state toward a predefined thermal mass temperature as previously described.

In one embodiment, the one or more control circuits 303 can further to estimate a charging time during which one or more of the one or more rechargeable batteries or the electronic device will be coupled to the charger or docking station 300. Alternatively, a user can push this information to the charger or docking station by actuating a charging optimization application (116) in an electronic device (100).

The one or more control circuits 303 can then cause the thermal management device 305 to one or more of selectively heat or selectively cool the one or more rechargeable batteries further as a function of the charging time. As noted above, some electronic devices include feature sets that allow a user to put the device to "sleep" for a predefined time by silencing alarms for a predefined time interval, thereby allowing the user to sleep. In one or more embodiments, one or more control circuits 303 of the charger or docking station 300 can retrieve information relating to this interval from the electronic device to permit charging of one or more rechargeable batteries coupled to the charger or docking station 300 to be deliberately slow so as to extend one or more of cycle life or energy storage capacity. Alternatively, the estimation of charging time during which the one or more rechargeable batteries or the electronic device will be coupled to the charger or docking station 300 can be determined from behavioral information, such as an average length that a user leaves the electronic device or one or more rechargeable batteries coupled to the charger or docking station 300.

In the illustrative embodiment of FIG. 3, the charger or docking station 300 includes three receivers 311,312,313. Each receiver 311,312,313 is to receive either one or more rechargeable batteries or an electronic device. While three receivers 311,312,313 are shown in this illustration, it should be noted that the charger or docking station could have fewer or more receivers as well.

In this illustrative embodiment, the first receiver 311 is to receive one or more rechargeable batteries. For example, the first receiver 311 of this illustrative embodiment includes one or more electrical terminals 314 to couple to the electrical terminals (121) of the one or more rechargeable batteries (118) of FIG. 1 to provide charging current to the at least one cell disposed within the one or more rechargeable batteries (118). The first receiver 311 could be configured differently depending upon the type of rechargeable battery it is to receive.

The second receiver 312 of this illustrative embodiment is to receive the electronic device. The second receiver 312 of FIG. 3 is designed to receive the electronic device (100) of FIG. 1 and includes one or more electrical terminals 315 to charge one or more rechargeable batteries (118) when they are coupled to the electronic device (100).

In this illustrative embodiment, to facilitate automatic replacement of one or more rechargeable batteries coupled to an electronic device, the charger or docking station 300 includes a third receiver 313 to receive another one or more rechargeable batteries. As will be shown in FIGS. 7-8 below, in one embodiment the charger or docking station 300 is to automatically detach a first battery and attach a second battery without user manipulation. Accordingly, a rechargeable battery may be positioned in the first receiver 311. A user may then place an electronic device with a depleted battery in the second receiver 312. A battery exchanger 317 can then decouple the previously coupled, and now depleted, battery from the electronic device when the electronic device is in the second receiver 312. The battery exchanger 317 can then translate the depleted battery from the second receiver 312 to the third receiver 313. The battery exchanger 317 can then attach the battery disposed in the first receiver 311 to the electronic device.

In one embodiment, the battery exchanger 317 comprises a motor to drive a wheel 318 to translate one or more rechargeable batteries from the first receiver 311 to the second receiver 312 for attachment to the electronic device. Other battery exchangers will be obvious to those of ordinary skill in the art having the benefit of this disclosure. Where the reverse process is to be carried out, i.e., attaching a battery disposed in the third receiver 313 to the electronic device after charging, the third receiver 313 can include a battery exchanger component 319 and electrical terminals 320 as well.

Figure 4:
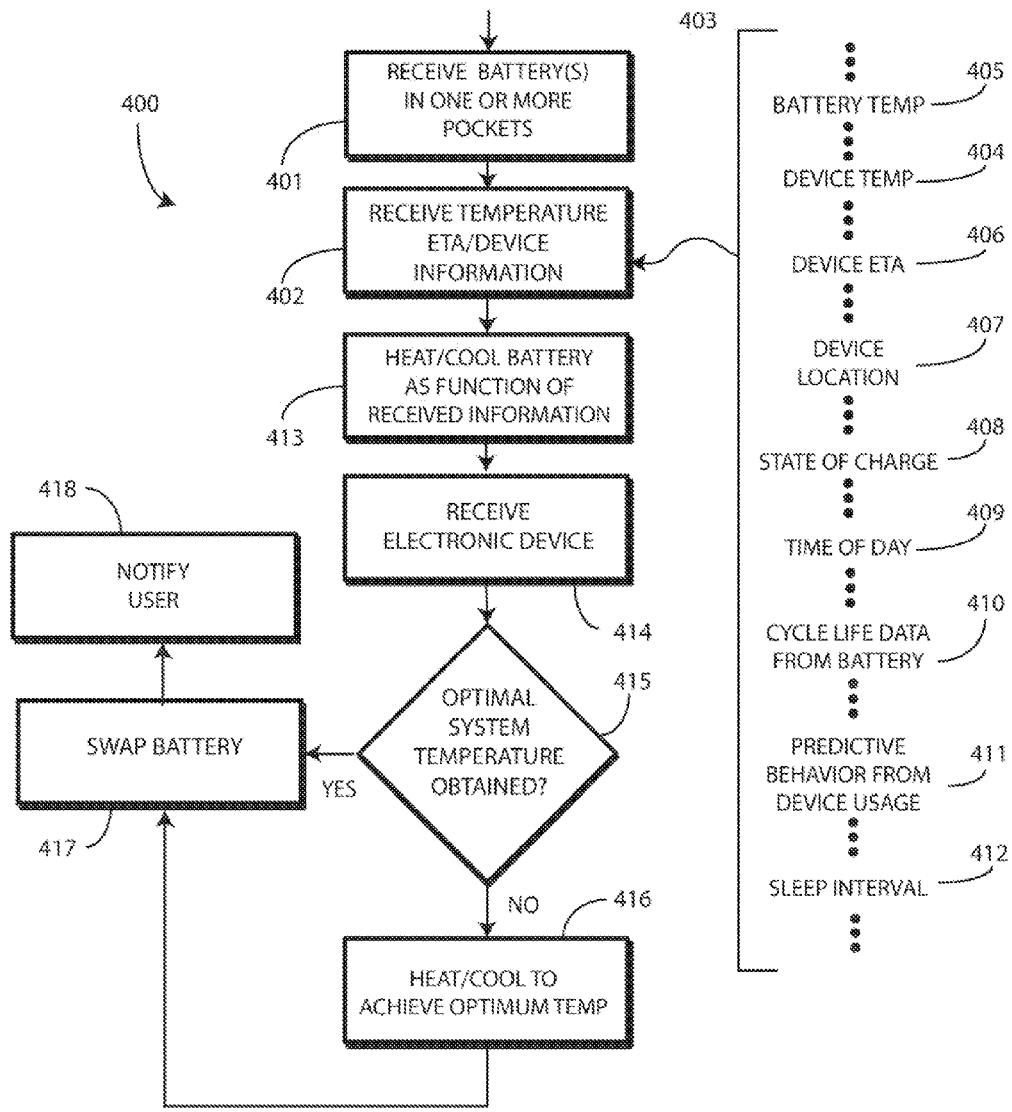
FIG. 4 illustrates explanatory method steps in accordance with one or more embodiments of the disclosure.
Figure 5:
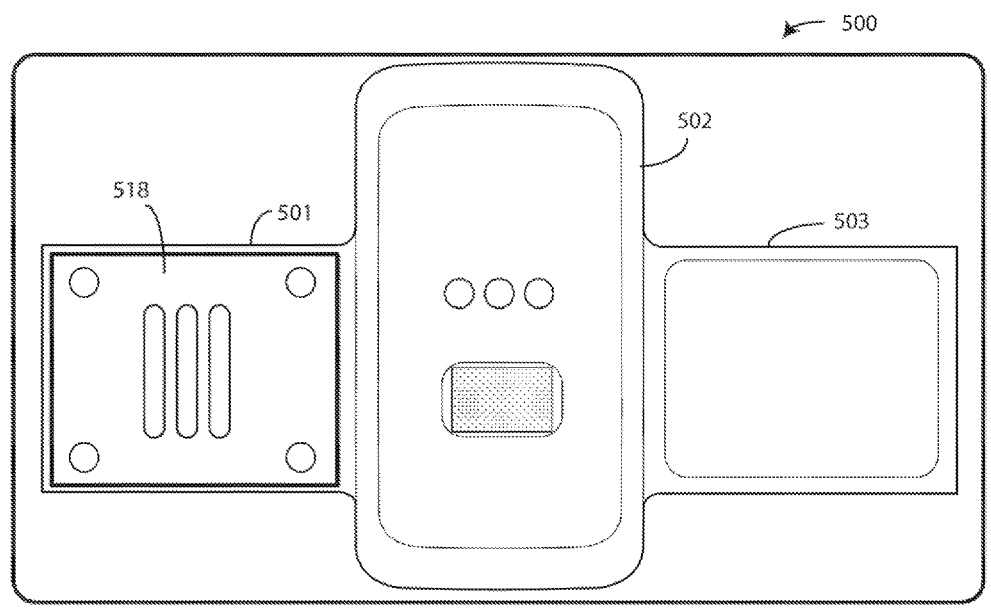
FIG. 5 illustrates one explanatory system and one or more method steps in accordance with one or more embodiments of the disclosure.

Turning now to FIG. 4, illustrated therein is a method 400 suitable for use with one or more rechargeable batteries (118), electronic devices (100), and chargers or docking stations (300) described herein. At step 401, the method 400 receives one or more rechargeable batteries in one or more receivers. For example, step 401 can include receiving the one or more rechargeable batteries in a first receiver. In one embodiment, the receivers are configured as pockets along a battery charger, charger, or docking station. Other configurations of receivers and/or pockets will be obvious to those of ordinary skill in the art having the benefit of this disclosure.

At step 402, the method 400 receives information 403 with which the method 400 can adjust one or more of charging rate or thermal condition of the one or more rechargeable batteries received at step 401. As noted above, this information can include an indication of a thermal state 404 of the electronic device. Examples of the indication of the thermal state 404 can include a temperature of the electronic device, an operating mode of the electronic device, a processor operating load of the electronic device, an application operating load of the electronic device, or other indicators that may provide information regarding the thermal state of the thermal mass defined by the electronic device. Other indications will be obvious to those of ordinary skill in the art having the benefit of this disclosure.

Other information 403 with which to alter charging rate and/or the thermal condition of the one or more rechargeable batteries received at step 401 can be receives as well. As noted above with reference to FIG. 2, the method 400 can receive an indication of the temperature 405 of the one or more rechargeable batteries received at step 401.

An estimated time 406 at which the one or more rechargeable batteries received at step 401 can be received as well. If, for example, a user generally places a spare battery in a battery charger in the morning and removes it in the evening, morning insertion at step 401 may cause the method 400 to estimate that the time 406 at which the one or more rechargeable batteries will be coupled to the electronic device will be between ten and twelve hours.

As also noted above, the information 403 can include an indication of a location 407 of the electronic device. This can be received from a location detector of the electronic device, and can provide an indication of when the electronic device will be coupled to a charger, battery charger, or docking station in accordance with one or more embodiments of the disclosure. The information 403 can also include a state of charge 408 of the one or more rechargeable batteries received at step 401. Where, for example, an electronic device to which the one or more rechargeable batteries are to be connected has an elevated thermal state and is running at less than full performance due, for example, a high operating temperature and a battery state of charge that is, again for example, about eighty percent. Perhaps if the one or more rechargeable batteries received at step 401 were at about the same state of charge or more, and were then cooled, swapping the one or more rechargeable batteries into the electronic device may increase operating performance to capacity.

The information 403 can also include a time of day 409. The method 400 may prefer to delay any heating or cooling of the one or more rechargeable batteries received at step 401 until a time near to the time when they were to be coupled to an electronic device. If the time of day 409 is midnight, it may be unlikely that a user will use the electronic device in the next five to six hours. Accordingly, knowing the time of day 409 would allow altering decisions to be advanced or delayed.

The information 403 can also include cycle life data 410 from the one or more rechargeable batteries received at step 401. Charging current may need to be altered to avoid degradation of the cycle life based upon a number of cycles the one or more rechargeable batteries have experience.

The information 403 can also include behavioral data 411 pertaining to the user as well. Illustrating by example, suppose that monitoring an electronic device belonging to a user named Buster reveals that Buster never uses his electronic device between the hours of 8:00 AM and 11:00 AM. However, he constantly uses the device between 7:15 and 9:00 PM when trying to decide what to order for dinner. Sometimes his search for exotic foods, such as barramundi, nearly fully depletes the battery attached to the device. Knowledge of this behavioral data 411 can be used to adjust charge rate and or a thermal condition of the one or more rechargeable batteries that are to be swapped into the device at 9:30 PM when Buster finishes eating his barramundi.

As noted above, the information 403 can include a time 412 during which the electronic device will be coupled to the battery charger, such as the sleep interval previously described. Advantageously, in embodiments where an electronic device includes sleep modes or other modes of operation where device usage is or is not expected within a predefined window, the method 400 can control the charge rate and/or thermal condition of the one or more rechargeable batteries received at step 401 based upon how much longer an electronic device will be coupled to a charger, battery charger, or docking station. In one or more embodiments, information 403 permits charging of one or more rechargeable batteries to be deliberately slow so as to extend one or more of cycle life or energy storage capacity.

At step 413, the method 400 performs one or more of the following functions: adjusting, with a charging circuit, a charging rate of one or more rechargeable batteries received at step 401, and altering, with a thermal management circuit, a thermal condition of the one or more rechargeable batteries received at step 401. The altering can comprise heating, cooling, or combinations thereof. While the adjusting and the altering can be a function of any combination of the information 403 components described above, in one embodiment, the adjusting and the altering is a function of a thermal state of an electronic device to which the one or more rechargeable batteries received at step 401 are to be attached, a charging temperature to reduce degradation of one or more cells of the one or more rechargeable batteries, a predefined thermal mass temperature of a thermal mass defined by the electronic device when coupled to the one or more rechargeable batteries, or combinations thereof.

In one embodiment, the adjusting and altering is further a function of an estimated time 406 at which the one or more rechargeable batteries will be coupled to the electronic device. In one embodiment, the adjusting and altering can be based upon estimating a time 412 during which the electronic device will be coupled to the charger, battery charger, or docking station and adjusting and altering as a function of the time 412. Other variations will be obvious to those of ordinary skill in the art having the benefit of this disclosure.

At step 414, the method optionally receives the electronic device. For example, step 414 can include receiving the electronic device in a second receiver of a charger, battery charger, or docking station. Decision 415 then determines a thermal state of the electronic device while separate from the one or more rechargeable batteries received at step 401. Decision 415 further determines whether a thermal condition of the one or more rechargeable batteries has been altered by an amount such that when the one or more rechargeable batteries are coupled to the electronic device, a thermal mass defined by the electronic device and the one or more rechargeable batteries transitions from the thermal state toward a predefined thermal mass temperature. Where this is not the case, step 416 continues the adjustment.

Where this is the case, step 417 replaces the battery originally coupled to the electronic device with the one or more rechargeable batteries received at step 401. While this can be done manually by the user, in one embodiment it is done automatically with the assistance of a battery exchanger. Thus, in on embodiment, step 417 can include one or more of: detaching, with the battery exchanger, another battery from the electronic device, optionally moving, with the battery exchanger, the another battery to a third receiver, moving, with a battery exchanger, the one or more rechargeable batteries received at step 401 from the first receiver to the second receiver, attaching, with the battery exchanger, the one or more rechargeable batteries to the electronic device to establish the thermal mass, or combinations thereof. These steps will be illustrated in more detail with reference to FIGS. 5-8 below. The user can then optionally be notified that the electronic device is ready to use at step 418.

Turning now to FIGS. 5-8, illustrated therein is a system configured in accordance with one or more embodiments of the disclosure. Beginning with FIG. 5, a battery charger 500 is shown configured as a docking station having one or more pockets. The battery charger includes one or more control circuits operable with a thermal management circuit to selectively heat or cool devices attached thereto. A user has placed a rechargeable battery 518 in the first pocket 501 so that it can be charged. The rechargeable battery 518 can comprise one or more rechargeable batteries. As described above, the one or more control circuits can determine, through a communication device, a thermal state of an electronic device that will be coupled to the battery charger 500 while the electronic device separate from the rechargeable battery 518. In one embodiment, the one or more control circuits can determine the thermal state of the electronic device prior to the electronic device being coupled to the battery charger 500. This is the case in FIG. 5.

The one or more control circuits can optionally receive location information (or any other information described above with reference to FIG. 4) of the electronic device prior to the electronic device being coupled to the battery charger 500. The one or more control circuits may make estimations from this information, one example of which is estimating a time by which the electronic device will be coupled to the battery charger.

Once this various information is received, the one or more control circuits can cause the thermal management circuit of the battery charger 500 to alter a thermal condition of the rechargeable battery 518 such that when the rechargeable battery 518 is coupled to the electronic device, a thermal mass defined by the electronic device and the rechargeable battery 518 transitions from the thermal state toward a predefined thermal mass temperature.

Figure 6:
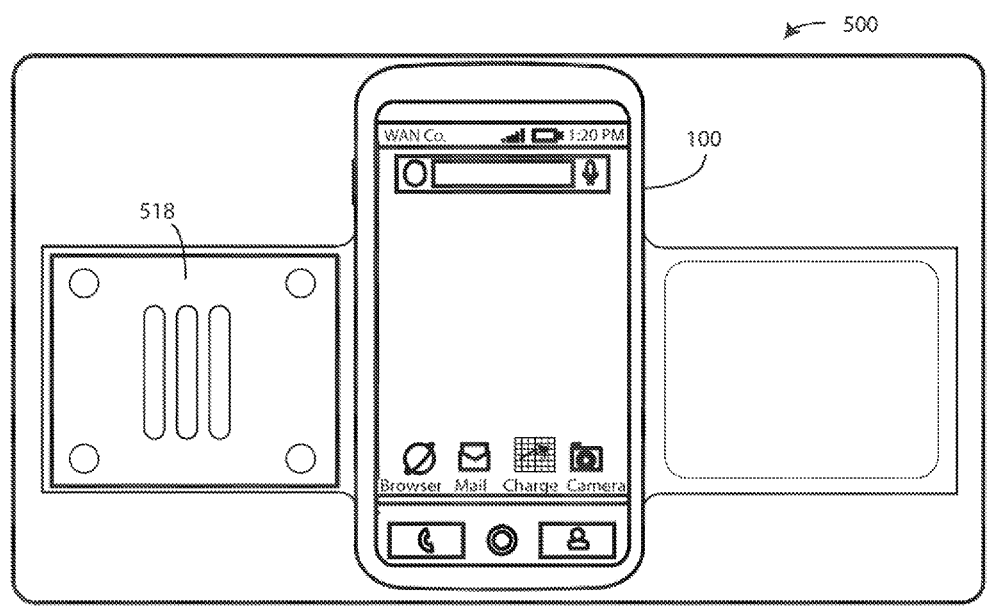
FIG. 6 illustrates one explanatory system and one or more method steps in accordance with one or more embodiments of the disclosure.

Turning now to FIG. 6, the electronic device 100 has been attached to the battery charger 500. The rechargeable battery 518 is ready to be coupled to the electronic device 100 so as to transition a thermal mass defined by the rechargeable battery 518 and the electronic device 100 toward a predefined thermal mass temperature. In this embodiment, the battery charger 500 includes a battery exchanger, which is shown in FIG. 7.

Figure 7:
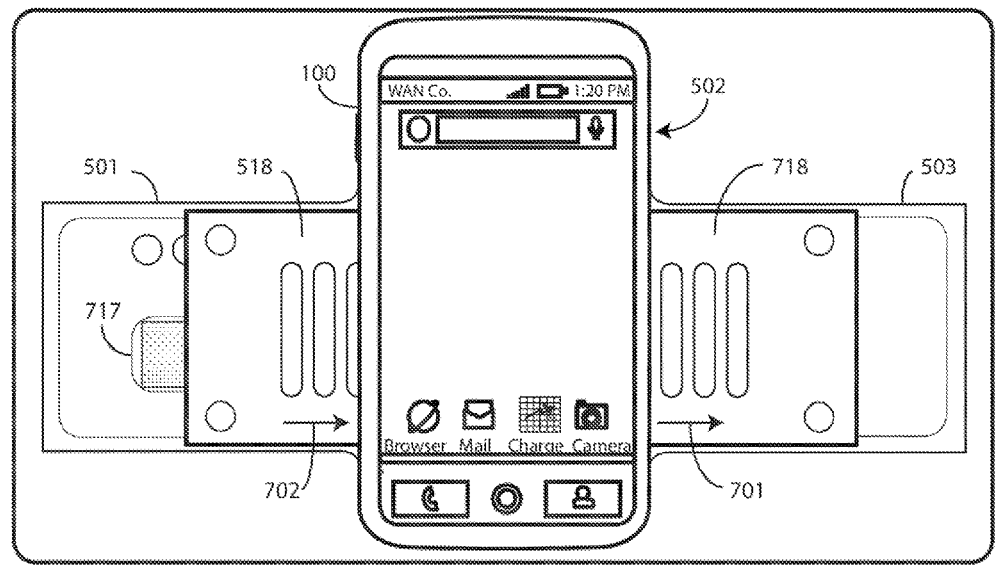
FIG. 7 illustrates one explanatory system and one or more method steps in accordance with one or more embodiments of the disclosure.

Turning now to FIG. 7, the battery exchanger 717 has detached the rechargeable battery 718 that was coupled to the electronic device 100. The battery exchanger 717 then moves 701 the rechargeable battery 718 from the second pocket 502 to the third pocket 503. The battery exchanger 717 further moves 702 the other rechargeable battery 518 from the first pocket 501 to the second pocket 502.

Figure 8:
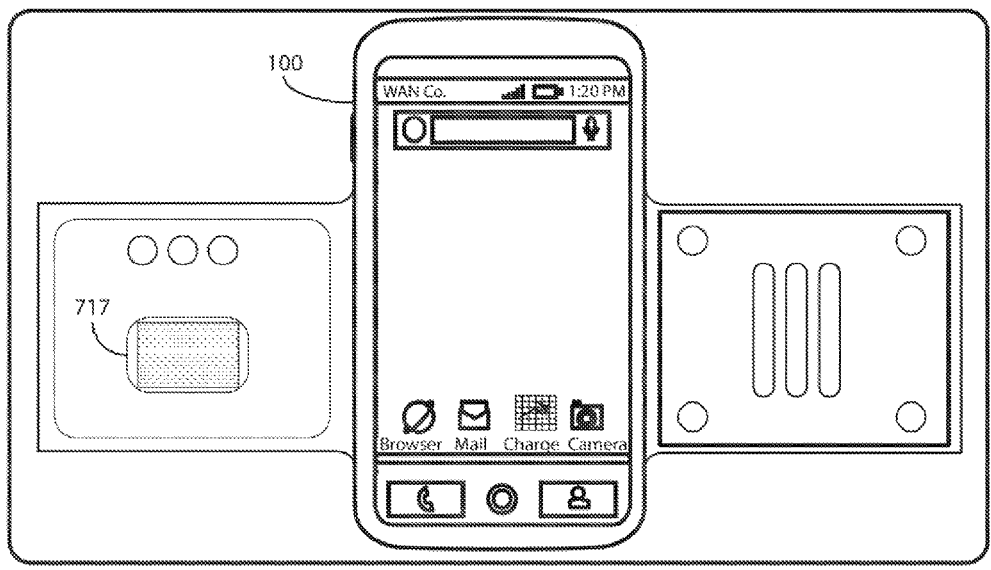
FIG. 8 illustrates one explanatory system and one or more method steps in accordance with one or more embodiments of the disclosure.

Turning now to FIG. 8, the battery exchanger 717, a component of which is disposed beneath, and hidden by, the electronic device 100, attaches rechargeable battery (518) to the electronic device 100. This establishes the thermal mass and has the result of working to transition the thermal mass to the predefined thermal mass temperature. The electronic device 100 is now returned to its peak operating state.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, while the functions of the one or more control circuits (105) are described as occurring in the charger or docking station (300), they could also occur in an electronic device (100) with a docking station serving only as the heating or cooling element operating in response to commands from the control circuits of the electronic device (100).

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A battery charger, comprising:
   one or more control circuits;
   a charging circuit, operable with the one or more control circuits, to charge one or more rechargeable batteries;
   a thermal management device, operable with the one or more control circuits, to alter a thermal condition of the one or more rechargeable batteries; and
   a communication circuit, operable with the one or more control circuits;
   the one or more control circuits to:
      receive, with the communication circuit, an indication of a thermal state of an electronic device; and
      upon receiving the indication of the thermal state of the electronic device, cause the thermal management device to alter the thermal condition of the one or more rechargeable batteries such that insertion of the altered one or more rechargeable batteries into the electronic device causes a thermal mass defined by the electronic device and the one or more rechargeable batteries to transition from the thermal state toward a predefined thermal mass temperature.

2. The battery charger of claim 1, the thermal management device to one or more of selectively heat or selectively cool the one or more rechargeable batteries as a function of the thermal state of the electronic device and the predefined thermal mass temperature.

3. The battery charger of claim 2, the charging circuit to alter a charge rate of the one or more rechargeable batteries as the function of the thermal state of the electronic device.

4. The battery charger of claim 1, the one or more control circuits further to:
   receive, with the communication circuit, location information of the electronic device;
   estimate a time by which the electronic device will be coupled to the battery charger; and
   cause the thermal management device to alter one or more of the thermal condition of the one or more rechargeable batteries or a charge rate of the one or more rechargeable batteries as a function of the time by which the electronic device will be coupled to the battery charger.

5. The battery charger of claim 4, the one or more control circuits to transition the thermal condition from a first temperature to a second temperature as the function of the time.

6. The battery charger of claim 5, the first temperature comprising a charging temperature to reduce degradation of one or more cells of the one or more rechargeable batteries, the second temperature to move the thermal mass from the thermal state toward the predefined thermal mass temperature.

7. The battery charger of claim 1, the one or more control circuits further to estimate a charging time during which one or more of the one or more rechargeable batteries or the electronic device will be coupled to the battery charger, the thermal management device to one or more of selectively heat or selectively cool the one or more rechargeable batteries further as a function of the charging time.

8. The battery charger of claim 1, the battery charger further comprising:
   a first receiver to receive the one or more rechargeable batteries;
   a second receiver to receive the electronic device; and
   a battery exchanger to attach the one or more rechargeable batteries disposed in the first receiver to the electronic device.

9. The battery charger of claim 8, the battery exchanger to attach the one or more rechargeable batteries disposed in the first receiver to the electronic device by translating the one or more rechargeable batteries from the first receiver to the second receiver for attachment to the electronic device.

10. The battery charger of claim 9, further comprising a third receiver, the battery exchanger further to translate the one or more rechargeable batteries from the second receiver to the third receiver.

11. The battery charger of claim 10, the battery exchanger further to decouple a previously coupled rechargeable battery from the electronic device when the electronic device is disposed within the second receiver.

12. A method, in a battery charger, the method comprising:
   adjusting, with a charging circuit, a charging rate of one or more rechargeable batteries; and
   altering, with a thermal management device, a thermal condition of the one or more rechargeable batteries;
   the adjusting and the altering a function of:
      a thermal state of an electronic device to which the one or more rechargeable batteries are to be attached;
      a charging temperature to reduce degradation of one or more cells of the one or more rechargeable batteries; and
      a predefined thermal mass temperature of a thermal mass defined by the electronic device when coupled to the one or more rechargeable batteries, such that insertion of the altered one or more rechargeable batteries into the electronic device causes the thermal mass defined by the electronic device and the one or more rechargeable batteries to transition from the thermal state toward predefined thermal mass temperature.

13. The method of claim 12, the adjusting and the altering further a function of an estimated time at which the one or more rechargeable batteries will be coupled to the electronic device.

14. The method of claim 12, further comprising:
   receiving, in a first receiver, the one or more rechargeable batteries;
   receiving, in a second receiver, the electronic device;
   moving, with a battery exchanger, the one or more rechargeable batteries from the first receiver to the second receiver; and attaching, with the battery exchanger, the one or more rechargeable batteries to the electronic device to establish the thermal mass.

15. The method of claim 14, further comprising:
detaching, with the battery exchanger, another battery from the electronic device; and
moving, with the battery exchanger, the another battery to a third receiver.

16. The method of claim 12, the altering comprising heating.

17. The method of claim 12, further comprising terminating charging of the one or more rechargeable batteries at a state of charge that is a function of the thermal state of the electronic device.

18. A system, comprising:
an electronic device;
a battery charger, the battery charger comprising one or more control circuits operable with a thermal management device to selectively heat or cool devices attached thereto; and
one or more rechargeable batteries;
the one or more control circuits to:
determine a thermal state of the electronic device while separate from the one or more rechargeable batteries; and
cause the thermal management device to alter a thermal condition of the one or more rechargeable batteries such that insertion of the altered one or more rechargeable batteries into the electronic device causes a thermal mass defined by the electronic device and the one or more rechargeable batteries to transition from the thermal state toward a predefined thermal mass temperature.

19. The system of claim 18, further comprising a communication circuit, the one or more control circuits to determine, with the communication circuit, the thermal state of the electronic device prior to the electronic device being coupled to the battery charger.

20. The system of claim 19, the one or more control circuits to:
receive, with the communication circuit, location information of the electronic device prior to the electronic device being coupled to the battery charger; and
estimate a time by which the electronic device will be coupled to the battery charger;
the thermal management device to alter the thermal condition of the one or more rechargeable batteries as a function of the time.

* * * * *